United States Patent
Vaidya et al.

[19]

[11] Patent Number: 6,051,805

[45] Date of Patent: Apr. 18, 2000

[54] METHODS AND APPARATUS FOR WELDING PERFORMANCE MEASUREMENT

[75] Inventors: Viwek V. Vaidya, Pointe-Claire; Christopher C.. L. Chasse, Chatequguay, both of Canada

[73] Assignee: Air Liquide Canada, Montreal, Canada

[21] Appl. No.: 09/008,903

[22] Filed: Jan. 20, 1998

[51] Int. Cl.[7] .................................................. B23K 9/095
[52] U.S. Cl. ........................................................ 219/130.01
[58] Field of Search ........................ 219/130.01, 130.21, 219/130.31, 130.32, 130.33; 346/33 R; 364/474.16

[56] References Cited

U.S. PATENT DOCUMENTS

| | | | |
|---|---|---|---|
| 2,340,114 | 1/1944 | Duis ..................................... | 219/130.01 |
| 2,366,548 | 1/1945 | Oestreicher et al. .............. | 219/130.01 |
| 3,359,561 | 12/1967 | Shostek ............................... | 219/130.01 |
| 3,535,491 | 10/1970 | Krolski ............................... | 219/130.01 |
| 3,725,637 | 4/1973 | Wenrich et al. .................... | 219/130.01 |
| 3,950,759 | 4/1976 | Ziegenfuss ........................... | 346/33 R |
| 4,375,026 | 2/1983 | Kearney .............................. | 219/130.01 |
| 4,605,836 | 8/1986 | Retfalvi et al. .................... | 219/130.01 |
| 4,996,409 | 2/1991 | Paton et al. ........................ | 219/130.01 |
| 5,708,253 | 1/1998 | Bloch et al. ........................ | 219/130.01 |

FOREIGN PATENT DOCUMENTS

WO96/40465  12/1996  WIPO.

OTHER PUBLICATIONS

Reilly, "Real–Time Quality Monitor Controls GMA Welding," *Welding Journal*, vol. 70, No. 3, 1991, pp 36–40.

"Cheap But Fast Micro Fits The Welder's Bill," *New Electronics*, vol. 23, No. 5, May 1990, pp 36–38.

*Primary Examiner*—Clifford C. Shaw
*Attorney, Agent, or Firm*—Jeffrey L. Wendt

[57] ABSTRACT

Methods and apparatus are provided for determining the duty cycle, average amperage, and/or the number of arc starts during a welding operation. The apparatus comprises first and second circuits, the first circuit being a CPU control circuit, and the second circuit being an arc time sensor circuit which is programmed to measure amperage, welding wire feed speed and preferably gas flow rates while welding. A ratio of the cumulative welding time during the audit to the total on-time provides a measurement of the efficiency of the welding arc. The welding deposition efficiency may then be calculated using the average amperage and welding duty cycle as measured and calculated by the apparatus. The number of arc starts where the arc on-time is in excess of one second may also provide a useable measurement in giving secondary information on the overall efficiency of the welding operation.

16 Claims, 2 Drawing Sheets

METHODS AND APPARATUS FOR WELDING PERFORMANCE MEASUREMENT

BACKGROUND OF THE INVENTION

1. Field of the Invention

The present invention relates generally to the field of welding. More specifically, the present invention relates to methods and apparatus designed to increase welding productivity of a manufacturing shop.

2. Related Art

The metal fabrication industry has been around for many years. After the first World War, the shielded metal arc process became very popular through the use of extrusion technology. For continuous operations, such a process was not useful. As a result, semiautomatic welding processes using continuous wire were developed in the 1960s to improve productivity. In the early 1970s, arc welding was a hot and dirty operation, using principally large diameter continuous consumable wires. As the technology to draw continuous consumable wire to smaller diameter became available in the early 1980s, the arc welding industry started using continuous consumable wire diameters as small as 0.030 inch for continuous welding. Today, both cored arc welding wires and solid arc welding wires are available in a range of diameter starting at 0.025 all the way to 0.25 inch for continuous welding. With the advent of robotic technology, the continuous consumable wires can be supplied in bulk packs with torsionless delivery, with individual weights of 1,000 pounds.

In spite of this evolution in the supply of continuous consumable wire, the average welding amperages used in the arc welding industry have substantially dropped due to availability of lower diameter continuous consumable wire sizes. Welding deposition rates are related to the welding amperage used. As a result of the decreased amperage, the welding deposition rates have also substantially reduced.

In order to increase the arc welding productivity of a manufacturing shop, it is often desirable to measure two (2) key parameters. First, it is desirable to establish the average amperages used during arc welding, which relate to the pounds deposited per hour at 100% arc efficiency. Second, it would be desirable to measure the efficiency of the welding arc at the point of use. The arc welding efficiency, in other words, could be described as the ratio of the time the welder spends actually arc welding divided by the welder's total time performing arc welding and related processes during the welder's work day (the sum of "time performing arc welding' and "time for related processes" is referred to as "total elapsed time" for simplicity herein). These related processes typically include setting the welding machine and accessories correctly, positioning himself so that he can appropriately weld in the most comfortable position, time spend changing electrodes, wires, taps, gas bottles, and other activities such as placing the grounds, waiting for cranes or cleaning. Time spent for coffee, lunch and other qualified absences are deducted and not included in total elapsed time.

Most arc welding management systems do not objectively measure the duty cycle experienced by the overall welding operation at the manufacturing plant. This is due to the unavailability of a suitable device and method that can be used without interrupting the manufacturing cycle, which would measure effectively the average amperage and the welding efficiency at the selected work station. Further, such a device should be affordable so that a number of such devices can be deployed in a manufacturing plant to generate meaningful evaluation of the overall arc welding productivity over a 24-hour period or more.

SUMMARY OF THE INVENTION

In accordance with the present invention, methods and apparatus are presented which overcome many, if not all, problems of previous methods and apparatus.

In one aspect, the invention comprises a performance arc time measurement apparatus comprising:

a) a first control circuit comprising a central processing unit, at least one RAM, an EPROM, and ACIA, an RS232 serial data port, and a clock; and b) a second control circuit connected to the first circuit, the second circuit comprising an analog digital converter, one or more control buttons, a power switch, a human-readable display (preferably an LCD digital alpha/numeric display), battery charger circuit, and a sensor input circuit.

Preferred embodiments of the apparatus of the invention are those wherein the first control circuit and the second control circuit are both contained in a single metal box; apparatus further comprising a DC shunt; a jack for calibration of the first and second control circuits; a welding machine connection diagram inside the metal box; a Hall effect sensor; a and battery charger circuit. Other preferred embodiments include those wherein the second control circuit is programmed to measure a feature selected from the group consisting of amperage during arc welding, welding wire feed speed, shielding gas flow rate while welding, or a combination of one or more of these features.

A second aspect of the invention is a method of performance arc time measurement comprising:

a) installing a performance arc time measurement apparatus of the invention on each of one or more arc welding power sources;

b) measuring the average amperages using the performance arc time measurement apparatus.

Preferred methods of the invention include one or more of the following steps:

c) calculating the average duty cycle using the performance arc time measurement apparatus;

d) measuring welding wire feed speeds using the performance arc time measurement apparatus;

e) calculating welding efficiency of a welder using the power source;

f) calculating welding deposition rates of a welder using the power source;

g) based on data gathered and using a software program (preferably that known under the trade designation BlueShield Consultant, by Air Liquide America), calculating welding cost per linear foot for a single pass weld for the manufacturing operation or determining welding cost per piece manufactured;

h) annualizing calculated savings for the manufacturing facility; and i) benchmarking productivity and developing an improvement strategy based on welding management principles and the data gathered in steps b) through h).

Other preferred methods of the invention include the steps of recording the duty cycle, average and number of arc starts of the welding machine, and welder efficiency, defined as above.

The various performance arc time measurement apparatus embodiments of the invention have been designed to be used in conjunction with a comprehensive welding service designed to provide customers with specialized expertise to streamline operations, maximize welding efficiency and reduce costs. The inventive apparatus is preferably self-contained, and preferably independently powered. The inventive apparatus is preferably capable of gathering information over a period of time (from a few hours to 999 hours) to determine the actual shop arc welding duty cycle by providing the following key data for a welding station:

amperage time—to determine average amperage and amperage-time histogram;

cumulative arc welding time during the audit/total arc time;

number of arc starts;

total on time (defined as the total cumulative time the arc is ignited).

The ratio of the cumulative arc welding time during the audit to the total elapsed time provides a measure of the efficiency of the welding arc. The arc welding deposition efficiency is then calculated using the average amperage and deposition rate for the wire type and diameter being used.

The number of arc starts, where the arc on time is in excess of one (1) second, also provides a useful measurement, which gives secondary information on the overall efficiency of the welding operation.

The present invention will be further understood with reference to the following detailed description and drawings, which are merely representative and not intended to limit the invention.

DESCRIPTION OF PREFERRED EMBODIMENTS

Figure 1:
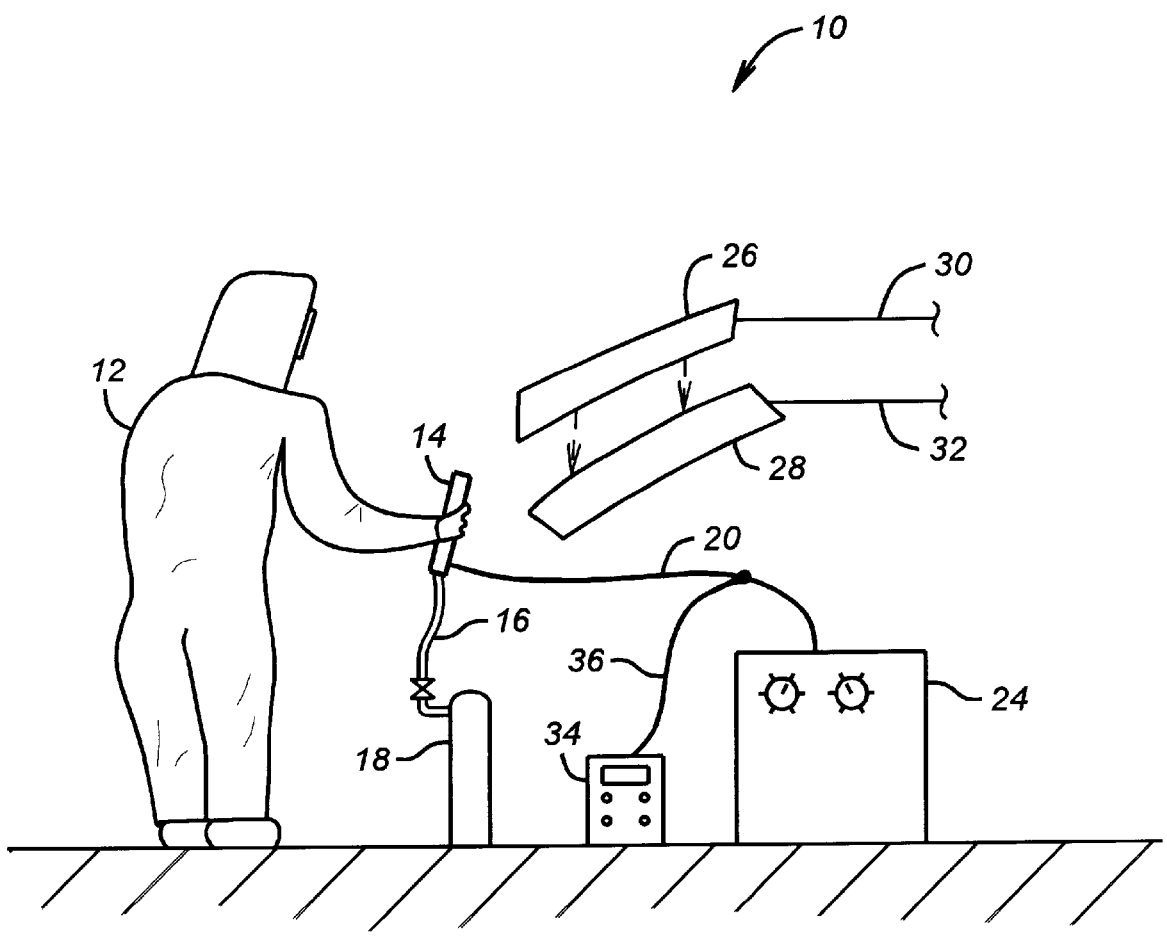
FIG. 1 is a schematic illustration of an arc welding station, illustrating an arc welding power source having attached thereto a performance arc time measurement apparatus in accordance with the present invention.

FIG. 1 illustrates schematically an arc welding station 10, the illustration being helpful to an understanding of the various aspects of the invention. An arc welder 12, here illustrated as human, although robotic welding machines are considered within the invention, holds an arc welding device 14 to which is attached tubing 16 which routes shielding gas from a cylinder or other source 18. Also illustrated schematically connected to the arc welding device 14 is a cable or electrical wire 20 which carries sufficient amperage from a power source 24 to effect the arc welding operation. The human or robot welder is illustrated in position to arc weld pieces 26 and 28 together, typically in a fillet weld, the pieces 26 and 28 being supported in FIG. 1 by fictitious supports 30 and 32, respectively. A performance arc time measurement apparatus of the invention is depicted at 34 and is attached via an electrically conducting wire or cable 36 to cable 20 which connects power source 24 to arc welding device 14. It will be understood that other connection schemes are possible and quite likely will be envisioned by the skilled welder, and those alternative connecting schemes are considered within the present invention.

Figure 2:
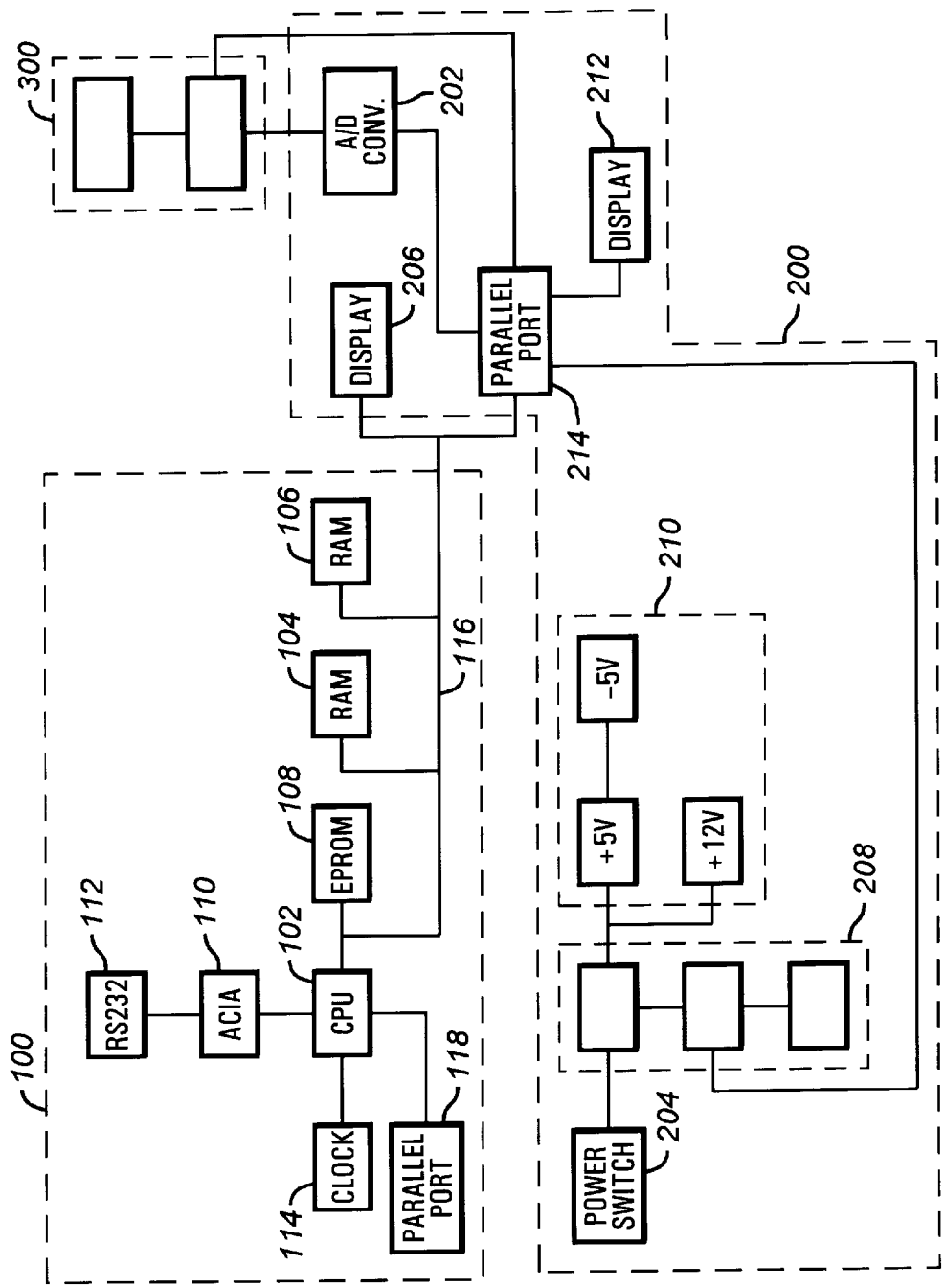
FIG. 2 is a schematic block diagram of the electrical circuitry of a performance arc time measurement apparatus in accordance with the present invention, including a first and second control circuit, an arc time sensor circuit and associated peripheral equipment.

Referring now to FIG. 2, electrical circuitry of a preferred performance arc time measurement apparatus of the invention is illustrated in block diagram format. This embodiment comprises two circuits. The first is a central processor unit (CPU) control circuit 100 and the second is an arc time sensor circuit 200, both preferably contained in the same suitable sheet metal box (not shown), preferably with a locking cover (not shown) for tamper resistance. Also illustrated in FIG. 2 is a DC shunt 300, which will include a jack for calibration, (the jack is not depicted in FIG. 2 for clarity). A Hall effect sensor can also be used instead of shunt 300. A welding machine connection diagram is preferably adhered on the inside of the metal box, preferably on the inside of the locking cover.

The CPU control circuit preferably contains a CPU (102), 64K RAM (104), 16K protected RAM (106), an EPROM (108), an ACIA (110), an RS232 serial data port (112) and a clock 114 all positioned on a circuit board (not shown). It interconnects with the arc time sensor circuit via electrical conductor 116. Parallel port 118 provides diagnostics function (typically lights) on the circuit board to help determine a problem with the circuit board.

The arc time sensor circuit 200 preferably comprises an analog to digital converter 202, a power switch 204, an LCD digital alpha/numeric display 206, a battery and battery charger circuit 208, and a sensor input circuit 210. The arc time sensor circuit may also have a buzzer 212 and external parallel port 214, the latter functioning to bring in data from the analog to digital converter 202, and from an optional continuous consumable wire speed reader.

Arc time sensor circuit 200 is preferably programmed to measure amperage, continuous consumable wire feed speed, and shield gas flow rates while arc welding. The performance arc time measurement apparatus of the invention is applied when an accurate reading of welding efficiency, average amperage and number of arc starts are desired. The information is preferably stored in a non-volatile memory semiconductor chip. This information is then converted with an analog to digital converter, with an adequate accuracy. The inventive apparatus accuracy is due to the crystal controlled accumulation clock, and the added ability to calibrate the unit using a programmable calibration circuit. All amperage readings are taken from a shunt or a Hall effect sensor. The inventive apparatus can be used for DC operations and the circuit is designed to store data in a temporary memory, should the power supply battery get discharged.

The arc time sensor circuit also has the ability to measure welding wire feed speeds on a continuous basis during an audit of an arc welding shop.

A preferred audit process comprises various steps to gather the relevant data with respect to the welding efficiency. A preferred audit would include the following steps, depending of course on the type of information desired.

Step 1 Install a performance arc time measurement apparatus on the welding power sources as required by the audit plan, one apparatus per power source.

Step 2 Measure the average amperages using the performance arc time measurement apparatus.

Step 3 Calculate the average duty cycle using the performance arc time measurement apparatus.

Step 4 Measure welding wire feed speeds using the performance arc time measurement apparatus.

Step 5 Calculate welding efficiency at the various stations.

Step 6 Calculate welding deposition rates at the various stations.

Step 7 Based on the data gathered and using a software program (preferably that known under the trade designation BlueShield Consultant, owned by Air Liquide), calculate welding cost per linear foot for a single pass weld for the manufacturing operation, or determine the welding cost per piece manufactured.

Step 8 Annualize calculated savings for the manufacturing facility.

Step 9 Benchmark productivity and develop an improvement strategy based on welding management principles.

The invention will be further described with reference to the following example which is intended to further illustrate the invention but not limit the scope of the claims to the particular aspects of the example.

Evaluation of Productivity

Ten (10) monitors were installed in the shop at various stations. The location of the monitors in the different segments of work areas is identified in Table C-1.

Production Welding Parameters

In tables C-2 and C-3, actual production welding parameters have been recorded. Table C-2, which sampled small assemblies and cabs welding areas, showed welding wire feed speeds between 555 to 599 inches per minute with an average of 577 inches per minute. The amperages varied between 210 to 230 amps and an average voltage was recorded at 29.3 volts. The average wire feed speed for 0.035" inch diameter wire as recorded at 577 IPM appeared substantially higher than the maximum of 450 IPM stipulated on the welding procedure sheets. The welding voltage was also found to be far higher at 29.3 volts to the 25 volts recommended on the welding data sheets.

Actual Welding Parameters

Table C-3 captures actual welding parameters as observed while using 0.045" inch diameter wire. The wire feed speed varied between 396 IPM to a maximum of 475 IPM with an average of 425 IPM. An average welding amperage was found to be at 296 amps The welding voltage measure varied between 28.8 volts to a maximum of 31.4 volts with an average of 29.9 volts.

The maximum wire feed speed per welding data sheets in the spray transfer was 410 IPM and in the short circuit transfer at 425 IPM. These values, again, are slightly lower than the actual wire feed speed values observed in production. The welding voltages as recorded on the data sheets were lower than the voltages observed during this testing with the exception of data sheet where wire feed speed maximum is at 410 IPM with a welding voltage of 30 to 32 volts.

Productivity Measurements Using 0.035" Diameter Wires (See Table 4)

Productivity for the small assemblies and the cabs areas was measured at an average of 17.2%.

It should be recognized that the numbers for welding productivity are uniquely for the welding component of the total assembly. Since this manufacturer employs welder fitters, a large proportion of the work done at the stations may be a fit-up operation as opposed to uniquely welding. However, since this manufacturer produces products on a repetitive basis, the productivity measurements are very significant to be competitive. The 17.2% productivity in the welding operations means that for every 100 minutes of the welders time at the work station, he actually welds for 17.2 minutes.

The arc starts varied between 765 and 1,321 per normalized 8-hour shifts. This indicates a significant fit-up and tack activity.

Productivity Measurements Using 0.045" Diameter Wires (See Table 5)

Table 5 records the productivity measurement numbers as obtained in the various areas using 0.045" diameter wire. An average duty cycle of 19.8% was observed in these areas with an average arc start at 548 per 8-hour shift. The deposition rate varied between 1.78 lbs/hour to a maximum of 3.14 lbs/hour with an average of 2.16 lbs/hour. The weighted averages are also indicated in Table 5 for the various areas.

Potential Cost Savings Due to Improved Duty Cycle

It is assumed that the duty cycle measured at 19.8% is generalized for the entire shop. In order to improve the duty cycle further, it would be essential to look at workflow and in process working inventory. The benchmark duty cycles for operations where a fixed quota has to be manufactured per day, is in the neighborhood of 28 to 35%. This would be the case for shops where work comes to the welding stations on conveyors and welders keep on completing the tasks with minimal worker interruptions.

In the opinion of the auditors, either this manufacturer has to regroup low performing operations and force them into better productivity by managing the workflow or go into some type of integrated robotic operations to improve the duty cycle. For heavily automated plants, where hard automation is used instead of robotics, it is common to encounter productivity numbers as high as 50 to 60%. A robotic cell must operate at 75 to 90% welding efficiency to make robotization really worthwhile.

Calculation of phase 2 in this analysis only indicates the magnitude of savings, should this manufacturer decide to streamline their welding operations. If the duty cycles were to be pegged at 25%, this manufacturer would be able to gain $285,507.00 per year in annual productivity gain. In other words, if the shop rearrangement including conveyors and handling devices cost the company. $500,000.00, this entire expenditure can be paid for within 2 years.

The software known under the trade designation BlueShield Consultant can be used to analyze potential cost savings, should this manufacturer decide to peg the productivity number at 30%, for example. Such an analysis can be done at a later date to come up with the proper ROI numbers for justifying capital expenditures in terms of shop layout or robotic investments if required.

TABLE 1

DESCRIPTION OF WORK STATIONS UNDER MONITORING

| Monitor No. | Arc Welding Process | Type of Wire | Wire Diameter | Gas Type |
|---|---|---|---|---|
| 1 | GMAW Semi-auto | ER70S-6 | .045 | Ar/CO$_2$ 90/10 |
| 2 | GMAW Semi-auto | ER70S-6 | .035 | Ar/CO$_2$ 90/10 |
| 3 | GMAW Semi-auto | ER70S-6 | .045 | Ar/CO$_2$ 90/10 |
| 4 | GMAW Semi-auto | ER70S-6 | .045 | Ar/CO$_2$ 90/10 |
| 5 | GMAW Semi-auto | ER70S-6 | .035 | Ar/CO$_2$ 90/10 |
| 6 | GMAW Semi-auto | ER70S-6 | .045 | Ar/CO$_2$ 90/10 |
| 7 | GMAW Semi-auto | ER70S-6 | .045 | Ar/CO$_2$ 90/10 |
| 8 | GMAW Semi-auto | ER70S-6 | .045 | Ar/CO$_2$ 90/10 |
| 9 | GMAW Semi-auto | ER70S-6 | .045 | Ar/CO$_2$ 90/10 |
| 10 | GMAW Semi-auto | ER70S-6 | .045 | Ar/CO$_2$ 90/10 |
| 11 | GMAW Semi-auto | ER70S-6 | .045 | Ar/CO$_2$ 90/10 |

TABLE 2

PRODUCTION WELDING PARAMETERS

Wire metal type: Er70S-6
.035 in. diameter

Process: GMAW
Protection Gas: Ar/CO$_2$ 90/10

| Date D/M/Y | Team | Source No. | Monitor No. | Position | Wire Feed speed (IPM) | Amperage (Amps) | Final Length (Inches) | Voltage (Volts) | Travel Speed (IPM) |
|---|---|---|---|---|---|---|---|---|---|
| 20/05/97 | Night | LW-009 | 2 | 2F | 599 | 230 | | 29,8 | |
| 20/05/97 | Night | LW-006B | 9 | 2F | 555 | 210 | | 28,8 | |
| Average | | | | | 577 | 220 | | 29,3 | |

TABLE 3

PRODUCTION WELDING PARAMTERS

CLIENT:

Process: GMAW
Wire metal type: Er70S- .035 in. diameter 6
Protection gas: Ar/CO$_2$ 90/10

| Date D/M/Y | Team | Monitor No. | Wire Feed speed (IPM) | Amperage (Amps) | Voltage (Volts) |
|---|---|---|---|---|---|
| 20/05/97 | Night | 1 | 399 | 275 | 30,0 |
| 20/05/97 | Night | 3 | 449 | 310 | 28,9 |
| 20/05/97 | Night | 4 | 441 | 340 | 29,8 |
| 20/05/97 | Night | 6 | 401 | 285 | 29,9 |
| 20/05/97 | Night | 7 | 434 | 400 | 29,9 |
| 20/05/97 | Night | 8 | 475 | 275 | 31,0 |
| 20/05/97 | Night | 9 | 414 | 290 | 31,4 |
| 20/05/97 | Night | 10 | 450 | 285 | 29,8 |
| 20/05/97 | Night | — | 421 | 280 | 30,2 |
| 20/05/97 | Night | — | 396 | 270 | 29,0 |
| 20/05/97 | Night | — | 399 | 250 | 28,8 |
| Average | | | 425 | 296 | 29,9 |

TABLE 4

PRODUCTIVITY MEASURES - RESULTS

Client:

Process: GMAW (Semi-auto)
Wire metal type: ER70S-6 .035 in. diameter
Protection gas: Ar/CO$_2$ 90/10

| Date D/M/Y | Team | Station # | Arc starts | Performance % | Wire feed speed in/min | Deposition rate lbs/h |
|---|---|---|---|---|---|---|
| 20/05/97 | Night | 2 | 956(765) | 17,2 | 599 | 1.60 |
| 20/05/97 | Night | 9 | 1087(870) | 19,8 | 555 | 1.70 |
| 21/05/97 | Day | 2 | 1021(817) | 17,4 | — | |
| 21/05/97 | Day | 9 | 986 | 19,7 | — | |
| 21/05/97 | Night | 2 | 1651(1321) | 18,0 | — | |
| 21/05/97 | Night | 9 | 1180(944) | 13,3 | — | |
| Average | | | 951 | 17,2 | 577 | 1,54 |

TABLE 5

PRODUCTIVITY MEASURES - RESULTS

Client:

Process: GMAW (Semi-auto)
Wire metal type: ER70S-6 .035 in. diameter
Protection gas: Ar/Co$_2$ 90/10

| Date D/M/Y | Team | Station # | Arc starts | Performance % | Wire feed speed in/min | Deposition rate lbs/h |
|---|---|---|---|---|---|---|
| 20/05/97 | Night | 1 | 477(382) | 25,6 | 399 | 2,62 |
| 20/05/97 | Night | 3 | 1087(870) | 24,0 | 449 | 2,76 |
| 20/05/97 | Night | 4 | 697(558) | 19,1 | 441 | 2,16 |
| 20/05/97 | Night | 6 | 1350(1080) | 30,5 | 401 | 3,14 |
| 20/05/97 | Night | 7 | 702(562) | 17,4 | 434 | 1,94 |
| 20/05/97 | Night | 8 | 516(413) | 14,6 | 475 | 1,78 |
| 20/05/97 | Night | 9 | 621(497) | 19,3 | 414 | 2,05 |
| 20/05/97 | Night | 10 | 711(569) | 18,2 | 450 | 2,10 |
| 20/05/97 | Night | — | — | — | 421 | — |
| 20/05/97 | Night | — | — | — | 396 | — |
| 20/05/97 | Night | — | — | — | 399 | — |
| 21/05/97 | Day | 1 | 291 | 25,2 | — | — |
| 21/05/97 | Day | 3 | 424 | 14,9 | — | — |
| 21/05/97 | Day | 4 | 259 | 8,8 | — | — |
| 21/05/97 | Day | 6 | 652 | 23,4 | — | — |
| 21/05/97 | Day | 7 | 653 | 23,6 | — | — |
| 21/05/97 | Day | 8 | 591 | 20,0 | — | — |
| 21/05/97 | Day | 9 | 657 | 22,0 | — | — |
| 21/05/97 | Day | 10 | 262 | 4,1 | — | — |
| 21/05/97 | Day | 1 | 510(408) | 23,3 | — | — |
| 21/05/97 | Day | 3 | 1166(777) | 20,2 | — | — |
| 21/05/97 | Day | 4 | 684(456) | 20,6 | — | — |
| 21/05/97 | Day | 6 | 354(472) | 31,3 | — | — |
| 21/05/97 | Day | 7 | 995(663) | 22,1 | — | — |
| 21/05/97 | Day | 8 | 685(457) | 8,6 | — | — |
| 21/05/97 | Day | 9 | 936(624) | 25,1 | — | — |
| 21/05/97 | Day | 10 | 366(576) | 10,0 | — | — |
| Average | | | 548 | 19,8 | 425 | 2,16 |

What is claimed is:

1. A performance arc time measurement apparatus comprising:
   a) a control circuit comprising a processor, a RAM, and EPROM, and ACIA, an RS232 Serial Data Port, and a clock;
   b) an arc time sensor circuit electrically connected to the first circuit, the arc time sensor circuit comprising an analog to digital converter, one or more control buttons, a power switch, and a human-readable display, a battery charger circuit, and a sensor input circuits;
   c) an arc time measuring means electrically connected to said arc time sensor; and d) an electrically conducting wire or cable connected at one end to the arc time measuring means, and having a second end adapted to connect electronically to a power source of a welding device.

2. The apparatus of claim 1 wherein the control circuit and the arc time sensor circuit are both contained in a single metal box.

3. An apparatus in accordance with claim 1 wherein the arc time measuring means comprises a DC shunt.

4. An apparatus in accordance with claim 3 which further includes a jack for calibration of the control circuit and the arc time sensor circuit.

5. An apparatus in accordance with claim 1 wherein the arc time measuring means comprises a Hall effect sensor.

6. An apparatus in accordance with claim 1 which further includes a battery charger circuit electronically connected to the arc time sensor circuit.

7. An apparatus in accordance with claim 1 wherein the arc time sensor circuit is programmed to measure a feature selected from the group consisting of amperage, consumable wire feed speed, gas flow rates while welding, or a combination of one or more of these features.

8. An apparatus in accordance with claim 1 wherein the human-readable display is an LCD digital alpha/numeric display.

9. A method of performance arc time measurement comprising:
   a) electronically connecting a performance arc time measurement apparatus of claim 1 on each of one or more arc welding power sources; and
   b) measuring the average amperages of the arc welding power source using the performance arc time measurement apparatus of claim 1.

10. A method in accordance with claim 9 including the step of:
   c) calculating the average duty cycle using the performance arc time measurement apparatus of claim 1.

11. A method in accordance with claim 10 including the step of:
   d) measuring consumable feed speeds using the performance arc time measurement apparatus of claim 1.

12. A method in accordance with claim 11 including the step of:

e) calculating welding efficiency of a welder using the power source.

13. A method in accordance with claim 12 including the step of:
   f) calculating welding deposition rates of a welder using the power source.

14. A method in accordance with claim 13 including the step of:
   g) based on data gathered and using a software program, calculating welding costs per linear foot for a single pass weld or determining welding cost per piece manufactured.

15. A method in accordance with claim 14 including the step of:
   h) calculating annual savings for a manufacturing facility using the calculated costs of step g).

16. A method of performance arc time measurement comprising:
   a) installing a performance arc time measurement apparatus of claim 1 on each of one or more arc welding power sources in a manufacturing facility;
   b) measuring the average amperages using the performance arc time measurement apparatus;
   c) calculating the average duty cycle using the performance arc time measurement apparatus;
   d) measuring consumable wire feed speeds using the performance arc time measurement apparatus;
   e) calculating welding efficiency of a welder using the power source;
   f) calculating welding deposition rates of a welder using the power source;
   g) based on data gathered and using a software program, calculating welding costs per linear foot for a single pass weld, or determining welding cost per piece manufactured;
   h) calculating annual savings for the manufacturing facility using the welding costs of step g); and
   i) benchmarking productivity and developing an improvement strategy based on welding management principles and the data gathered in steps b) through h).

* * * * *

UNITED STATES PATENT AND TRADEMARK OFFICE
CERTIFICATE OF CORRECTION

PATENT NO : 6,051,805
DATED : April 18, 2000
INVENTOR(S) : Viwek V. VAIDYA, et al.

It is certified that error appears in the above-identified patent and that said Letters Patent is hereby corrected as shown below:

In Table 5, please change the word "Day" in lines 46-51 to --Night--.

Signed and Sealed this

Sixth Day of March, 2001

Attest:

NICHOLAS P. GODICI

Attesting Officer

Acting Director of the United States Patent and Trademark Office